United States Patent [19]

Shimamoto et al.

[11] 4,339,486
[45] Jul. 13, 1982

[54] METHOD FOR TEMPORARILY PROTECTING STICKY SURFACE AND A THUS PROTECTED ADHESIVE SHEET MATERIAL

[75] Inventors: Noboru Shimamoto; Satoshi Yumoto, both of Annaka, Japan

[73] Assignee: Shin-Etsu Chemical Co., Ltd., Tokyo, Japan

[21] Appl. No.: 218,944

[22] Filed: Dec. 22, 1980

[30] Foreign Application Priority Data

Dec. 28, 1979 [JP] Japan ............................ 54-173841

[51] Int. Cl.³ .......................................... B32B 33/00
[52] U.S. Cl. .................................... 428/40; 156/329; 428/447; 428/464
[58] Field of Search .............. 206/412, 417; 156/329; 428/40, 447, 464

[56] References Cited

U.S. PATENT DOCUMENTS

| | | | |
|---|---|---|---|
| 1,883,421 | 10/1932 | Stevens | 428/40 |
| 2,314,146 | 3/1943 | Katz | 206/412 X |
| 2,368,140 | 1/1945 | Johnson | 428/533 X |
| 2,599,359 | 6/1952 | Banks et al. | 428/40 X |
| 3,284,276 | 11/1966 | Berenbaum et al. | 428/336 X |
| 3,545,643 | 12/1970 | Higgins et al. | 206/447 X |
| 4,009,319 | 2/1977 | Cline | 428/464 X |
| 4,016,328 | 4/1977 | Horning | 428/447 X |

*Primary Examiner*—Henry F. Epstein
*Attorney, Agent, or Firm*—Toren, McGeady & Stanger

[57] ABSTRACT

The present invention provides a unique solution of the difficult problem in the prior art that no efficient peelable release paper is available for temporarily protecting the sticky surface of the adhesive sheet material, e.g. adhesive tapes, adhesive labels, stickers and the like, from inadvertent sticking to an undesired surface when the sticking agent on the adhesive sheet is a silicone-based one. The inventive adhesive sheet material with temporarily protecting covering sheet is formed by use of a sheet of a hydrophilic material such as cellophane impregnated with water in a water content of at least 10% by weight as the temporarily protecting covering sheet. The thus hydrated protecting covering sheet is peelable with a relatively small peeling force without affecting the sticking power of the sticky surface of the adhesive sheet material.

4 Claims, 3 Drawing Figures

METHOD FOR TEMPORARILY PROTECTING STICKY SURFACE AND A THUS PROTECTED ADHESIVE SHEET MATERIAL

BACKGROUND OF THE INVENTION

The present invention relates to a method for temporarily protecting a sticky surface of an adhesive sheet material having a layer of a silicone-based sticking agent and an adhesive sheet material thus protected from inadvertent sticking with a peelable protecting sheet or a release sheet.

A variety of adhesive sheet materials are currently used such as adhesive labels, adhesive tapes and the like. Such an adhesive sheet material is formed by providing a layer of a sticking agent on the surface of a substrate sheet material such as papers, plastic films, metal foils and the like according to particular needs and is conveniently used to be bonded with stickiness on to the surface of an article without the necessity of re-moistening with water as in postage stamps. Owing to the convenience in their use, demand for such adhesive sheet materials is rapidly growing.

One of the problems in the adhesive sheet material is the protection of the sticky surface from inadvertent sticking to an undesired surface. A generally practiced method is to bond a so-called peelable release paper to the sticky surface of the adhesive sheet material for temporary protection and the release paper is removed by peeling directly before use of the adhesive sheet material. Needless to say, the performance of temporary protection by use of a peelable release paper largely depends on the combination of the sticking agent forming the sticky layer on the surface of the adhesive sheet material and the releasing agent or anti-sticking agent to impart releasability to the surface of the peelable release paper. The requirements for the peelable release paper are diversified. For example, the release paper once bonded to the sticky surface must not spontaneously come off without an outer peeling force but it must be readily removed by peeling with a relatively small peeling force when desired causing no decrease in the sticking power of the adhesive sheet material or so-called residual sticking power.

The above mentioned requirements for the combination of the sticking agent and the releasing agent are sometimes contradictory to each other so that no single method of temporary protection hitherto proposed is applicable to all kinds of the adhesive or sticking agents. Various types of sticking agents are used in the art including natural rubber-based ones, acrylic ones, terpene-based ones and silicone-based ones. On the other hand, the releasing agents most widely used for the preparation of peelable release paper are those based on a silicone releasing agent by virtue of the outstandingly excellent performance in comparison with the releasing agents of the other types. Satisfactory temporary protection of the sticky surface is obtained with such a silicone-treated peelable release paper when the sticking agent in the sticky layer of the adhesive sheet material is not a silicone-based one.

Unfortunately, silicone-treated peelable release papers are relatively ineffective for the temporary protection of the sticky surface of the adhesive sheet materials having a surface layer formed with a silicone-based sticking agent. Therefore the application of the silicone-based sticking agents is unduly narrowly limited despite their very high performance as a sticking agent per se due to the lack of an effective means for temporarily protecting the sticky surface thereof on the adhesive sheet materials.

SUMMARY OF THE INVENTION

It is therefore an object of the present invention to provide a novel method for temporarily protecting the sticky surface of an adhesive sheet material having a sticky layer formed with a silicone-based sticking agent, by which not only complete temporary protection is obtained but also the residual sticking power of the adhesive sheet material to be put to use is so large that the sticking power of the adhesive sheet material before protection is almost completely retained even after removal of the temporary protecting means.

Another object of the invention is to provide an adhesive sheet material having a sticky layer formed of a silicone-based sticking agent and having a temporary protecting covering on the sticky surface thereof, which is readily removed by peeling with a relatively small peeling force without causing decrease in the residual sticking power of the sticky surface.

The method of the present invention for temporarily protecting the sticky surface of an adhesive sheet material having a sticky surface layer formed with a silicone-based sticking agent comprises providing a protecting covering as bonded to the sticky surface, at least the interfacial layer of the said protecting covering contains 10% by weight or more of water.

The temporarily surface-protected adhesive sheet material of the present invention comprises a substrate sheet, a sticky layer formed of a silicone-based sticking agent on at least one surface of the substrate sheet and a protecting covering bonded to the surface of the sticky layer, at least the interfacial layer of the said protecting covering containing 10% by weight or more of water.

DETAILED DESCRIPTION OF THE PREFERRED EMBODIMENTS

Figure 1:
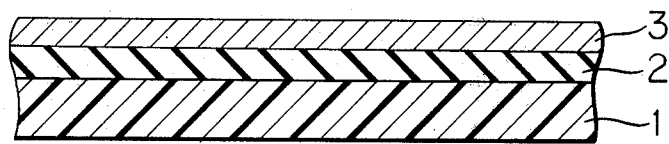
FIGS. 1 to 3 each illustrate a cross sectional view of an adhesive sheet material of the present invention provided with a temporary protecting covering on the sticky surface of the layer formed of a silicone-based sticking agent.

There are known several types of silicone-based sticking agents and the application of the present invention is not limited to a particular type of them. One of the typical silicone-based sticking agents is a condensation product of a methylpolysiloxane composed of monofunctional $(CH_3)_3SiO_{0.5}$ units and tetrafunctional $SiO_2$ units and a high-polymeric gum-like diorganopolysiloxane. The silicone-based sticking agent of this type exhibits its sticking power in an extremely wide temperature range from $-65°$ C. to $+250°$ C. in comparison with the sticking agents of the other kinds. Further, the silicone-based sticking agent has very excellent anti-weathering and anti-aging resistance as well as anti-chemicals resistance in addition to the electrical properties with good stability even in an atmosphere at elevated temperatures and with high humidities.

Moreover, silicone-based sticking agents have very good compatibility with a variety of substrate materials including not only metals, glasses, papers, fabrics and synthetic resins, with which sticking agents of the types other than the silicone-based ones also have good compatibility, but also silicone-based materials such as silicone rubber sheets and silicone varnish-impregnated glass cloths as well as sheets of fluorocarbon resins exhibiting excellent anchoring strength so that these materials all can be a substrate sheet of the adhesive sheet material in the invention.

That is, the substrate sheet of the inventive adhesive sheet material may be made of a metal such as aluminum, copper, stainless steel and the like, glass, a synthetic resin such as polyvinyl chloride resins, fluorocarbons resins, polyimide resins, polyester resins, silicone rubbers, silicone varnishes and the like as well as composite materials with these resins, e.g. silicone varnish-impregnated glass cloths, paper, a woven or non-woven fabric of a natural or synthetic fiber, or the like.

The typical silicone-based sticking agent mentioned above is prepared by the condensation reaction or addition reaction of 30 to 70% by weight of a diorganopolysiloxane represented by the general formula

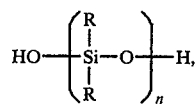

in which R is a hydrogen atom or a monovalent hydrocarbon group and n is a positive integer, end-blocked with hydroxy groups and having a viscosity of at least 100,000 centistokes at 25° C. with 70 to 30% by weight of an organopolysiloxane composed of the monofunctional siloxane units $R_3^1SiO_{0.5}$, in which $R^1$ is a monovalent hydrocarbon group, and the tetravalent siloxane units $SiO_2$ in a molar ratio of $R_3^1SiO_{0.5}/SiO_2$ equal to 0.4 to 1.15 in the presence of a suitable catalyst according to the procedure described, for example, in Japanese Pat. No. 50-10615. The method for coating the surface of the substrate sheet with the silicone-based sticking agent may be conventional and is not described here in detail.

When temporary protection of the sticky surface of the thus prepared adhesive sheet material with the silicone-based sticking agent is desired, a silicone-treated release paper is not suitable as is mentioned before since a silicone-treated release paper applied to the sticky surface of the adhesive sheet material is firmly bonded to the sticky surface presumably due to the relatively high affinity between the silicone-based sticking agent and the silicone releasing agent so that the release paper thus bonded can no longer be removed by peeling with a relatively small peeling force.

In seeking an effective method for the temporary protection of the sticky surface in such a case, the inventors have come to an unexpected discovery that the most effective and practical method in such a purpose is to provide a protecting covering on to the sticky surface where the protecting covering contains, at least in the interfacial layer thereof, 10% by weight or more or, preferably, 20% by weight or more of water based on the dry weight of the protecting covering. Such a hydrated protecting covering sheet can be temporarily bonded to the sticky surface and can readily be removed by peeling with a relatively small peeling force without affecting the residual sticking power of the sticky surface.

The above mentioned water content in the protecting covering is essential since a smaller water content or lower degree of hydration of the covering may result in strong bonding of the protecting covering to the sticky surface so that the protecting covering is difficultly peelable when desired to be removed. It should be noted that the above mentioned water content in the protecting covering is not necessarily maintained throughout the period of storage of the adhesive sheet material with the protecting covering bonded thereon. In other words, the adhesive sheet material with the protecting covering bonded thereon may be stored with a water content in the protecting covering smaller than 10% by weight, if desired, while the peelability of the protecting covering can be resumed by re-moistening the protecting covering directly before removal of the covering to have a water content in excess of the above defined lower limit, if the re-moistening can be carried out without troubles.

The material of the protecting covering sheet is, from the standpoint of the hydration with water, desirably hydrophilic in itself to be capable of absorbing the desired amount of water by wetting. It should be noted, however, even a less hydrophilic material may be used for the protecting covering when the surface of the cover coming into contact with the sticky surface of the adhesive sheet material has a fine texture or rugged structure so as to be able to retain a sufficient amount of water by the capillary phenomenon.

Several of the examples of the suitable materials for the protecting covering from the standpoint of water-absorptivity are papers such as kraft paper, glassine paper, parchment paper, filter paper and the like, woven, non-woven or knit fabrics of natural fibers, e.g. cotton, flax, wool and silk, or synthetic fibers, e.g. rayon, cellulose acetate, nylon, polyvinyl alcohol and polyester, films of a hydrophilic polymeric material such as cellophane, films of cellulose acetate and films of polyvinyl alcohol as well as cellophane-laminated polyethylene films. In particular, satisfactory results are obtained in respect of water retention in the protecting covering with a composite sheet having a sandwich structure formed with a polyacrylamide grafted on starch particles as the core material sandwiched between films of a hydrophilic polymeric material such as cellophane and the like. Further, it is recommendable to use a laminated sheet composed of a sheet of a hydrophilic, water-absorptive material such as cellophane and a water-impermeable film or foil such as an aluminum foil. Such a laminated sheet is used by moistening the water-absorptive layer with water to give a desired water content and the thus moistened surface is applied and bonded to the sticky surface whereby vaporization of water from the hydrated layer is prevented by the water-impermeable layer of, for example, the metal foil so that the once established water content can be maintained lastingly.

The accompanying drawing illustrates several typical embodiments of the inventive adhesive sheet materials with temporary protection by their cross sections. In FIG. 1, the substrate sheet 1 is provided with the sticky layer 2 of the silicone-based sticking agent on one surface only and the sticky surface of this layer 2 is protected with a protecting covering sheet 3 containing a suitable amount of water.

Figure 2:
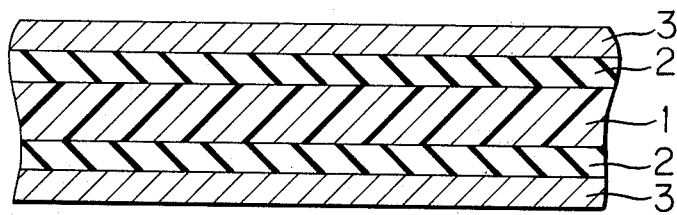

FIG. 2 is a cross sectional view of a both-sided adhesive sheet material formed by providing sticky layers 2,2 on both surfaces of the substrate sheet 1 and each of the sticky surfaces is protected with a protecting covering 3 containing a suitable amount of water just like the protecting covering 3 in FIG. 1.

Figure 3:
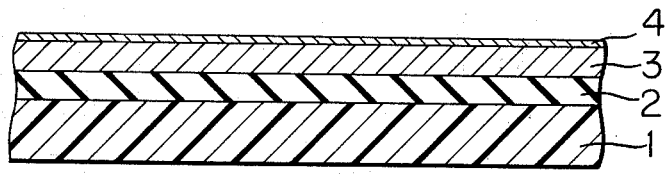

FIG. 3 illustrates a cross sectional view of a one-sided adhesive sheet material similar to that in FIG. 1. Different from the protecting covering sheet 3 in FIG. 1, the protecting covering in FIG. 3 is composed of a hydrophilic layer 3 containing a suitable amount of water and a metal foil 4 laminated thereon to prevent evaporation of water to keep the water content in the hydrophilic layer 3 constant. When such an evaporation-preventing metal foil is not provided as shown in FIG. 1 or FIG. 2, the adhesive sheet materials should preferably stored in a sealed container in order to minimize the decrease of the water content in the hydrophilic layer 3 or layers 3,3. It is of course optional that the adhesive sheet material with the temporary protection is as a whole kept as dipped in water when the material of the substrate sheet 1 is not affected by water such as a plastic sheet or a metal foil.

When the water content in the hydrophilic layer 3 is lower than 10% by weight at the moment of removal of the protecting covering to cause difficulties in peeling, the protecting covering may be replenished with water either by dipping in water or by spraying of water to absorb the water thereinto. When the water content in the interfacial layer of the protecting covering has become sufficiently high, the protecting covering is now ready to be removed by peeling with a relatively small peeling force.

The adhesive sheet materials of the present invention as described above in detail are very advantageous in the peelability of the temporary protecting covering from the sticky surface as well as in the high retention of the residual sticking power after removal of the temporary protecting covering so that they find wide applications as adhesive tapes, adhesive labels, stickers and the like.

Following are the examples to illustrate the present invention in further detail with several comparative examples.

EXAMPLES 1 TO 3 AND COMPARATIVE EXAMPLES 1 AND 2

A silicone rubber tape having a width of 19 mm and a thickness of 0.5 mm was coated on one side with a silicone-based sticking agent (KR 101-10, tradename of a product manufactured by Shin-Etsu Chemical Co., Japan) followed by a heat treatment according to the recommended prescription to give an adhesive tape provided with a layer of the sticking agent having a thickness of 30 μm.

The characterization of the above prepared adhesive tape was as follows.
(a) Stickiness, grade in the J. Dow's ball-tag method: 38
(b) Sticking power, expressed by the peeling force required to peel off the tape applied and bonded to the surface of stainless steel plate by pulling in a 180° direction: 620 g/19 mm
(c) Cohesive strength, expressed by the distance of sliding of the tape of 10 mm width and 20 mm length applied and bonded to the surface of a stainless steel plate and pulled for 30 minutes with a pulling force of 1 kg: 0.10 mm On the other hand, each a sheet of cellophane, brown paper and cotton cloth was dipped in water at room temperature and kept there for 24 hours to absorb water to an equilibrium content and the water-containing sheet of paper or cloth was taken out of the water and the free water on the surface was removed by wiping away with a filter paper. A piece of the thus obtained water-containing paper or cloth was applied to the surface of the adhesive tape and bonded thereto by pressing with a load of 100 g/cm$^2$ to protect the sticky surface of the tape. The adhesive tape with the temporary protecting covering prepared in this manner was put into a bag of aluminum foil and kept at 30° C. for 10 days with hermetic sealing of the bag.

The adhesive tape taken out of the aluminum bag was tested for the peelability of the temporary protecting covering of the cellophane, brown paper or cotton cloth by measuring the resistance in peeling of the protecting covering pulled in a 180° direction expressed in grams per 5 cm width. Further, the adhesive tape with the protecting covering removed was tested for the residual sticking power in the same manner as in the above described determination with the adhesive tape before the application of the wet protecting covering. The results are shown in Table 1.

For comparison, the same experimental procedure as above was undertaken with a polyethylene film or a commercially available silicone-treated release paper as the temporary protecting covering instead of the above used wet paper or cloth. The results are also shown in Table 1.

The adhesive tape prepared above with the wet cellophane as the temporary protecting covering was exposed to open air in a room for 60 minutes so as that the water content of the cellophane decreased to about 20% by weight. The results of the testing for this adhesive tape protected with the semi-dried cellophane were approximately identical with the results with the fully wetted cellophane.

EXAMPLE 4

An adhesive tape was prepared by providing a layer of the same sticking agent as used in the preceding examples in a uniform thickness of 40 μm on the surface of a film of a polyamideimide resin treated in advance with a primer.

On the other hand, a composite protecting covering sheet having a sandwich structure was prepared with two cellophane sheets of each 60 μm thickness sandwiching a core material in a layer of 100–500 μm thickness which was formed with a water-absorptive acrylamide polymer grafted on starch (Sanwet IM-300, tradename of a product manufactured by Sanyo Kasei Co., Japan) shaped into a film by the aid of a polyvinyl alcohol as a film-forming agent admixed therein and soaked with water to a water content of 500% by weight.

This composite protecting covering sheet was applied and bonded to the sticky surface of the adhesive tape and kept at room temperature for 24 hours. The peelability of the protecting covering was complete without adhesive bonding and the residual sticking power of the sticky surface after removal of the protecting covering was sufficiently high in comparison with the adhesive tape as prepared.

EXAMPLES 5 TO 7 AND COMPARATIVE EXAMPLES 3 TO 5

An adhesive tape was prepared with a tape of a polytetrafluoroethylene resin as the substrate uniformly coated with the same silicone-based sticking agent as used in the preceding examples in a coating thickness of about 40 μm.

A piece of a film of polyvinyl alcohol heat-treated in advance at 120° C. for 3 hours, rayon cloth or cellophane was applied and bonded to the sticky surface of the adhesive tape and kept standing at room temperature for 10 days as exposed to the open atmosphere. Each of the adhesive tapes with the protecting covering sheet was subjected to the test of the peeling resistance of the protecting covering to find that the protecting covering was no longer peelable as firmly bonded to the surface of the adhesive tape.

The above prepared adhesive tapes protected with a film of polyvinyl alcohol, rayon cloth or cellophane and kept at room temperature for 10 days were then dipped in water. When the water absorption had reached equilibrium, each of the adhesive tapes was taken out of water and the water content of the protecting covering and the peeling resistance of the covering were determined to give the results shown in Table 1 below under the headings of Examples 5 to 7, respectively.

TABLE 1

|  | Example | | | | | | Comparative Example | |
|---|---|---|---|---|---|---|---|---|
|  | 1 | 2 | 3 | 5 | 6 | 7 | 1 | 2 |
| Material of protecting covering | Cellophane | Brown paper | Cotton cloth | Polyvinyl alcohol | Rayon cloth | Cellophane | Polyethylene | Release paper* |
| Water content, % by weight | 121 | 52 | 210 | 90 | 25 | 121 | 0.01 | 0.01 |
| Peeling resistance, g/5 cm | 1 | 1 | 1 | 5 | 10 | 2 | Not peelable | Not peelable |
| Residual sticking power, g/19 mm | 580 | 520 | 500 | 510 | 480 | 570 | — | — |

*Commercially available silicone-treated release paper

What is claimed is:

1. An adhesive sheet material protected from inadvertent sticking which comprises
   (a) a substrate sheet,
   (b) a sticky layer formed on at least one surface of the substrate sheet with a silicone-based sticking agent, and
   (c) a protecting covering sheet made of a hydrophilic material applied and bonded to the surface of the sticky layer, at least the interfacial layer of the said protecting covering sheet containing 10% by weight or more of water based on the dry weight.

2. The adhesive sheet material as claimed in claim 1 wherein the silicone-based sticking agent is a condensation product of from 30 to 70% by weight of a diorganopolysiloxane represented by the general formula

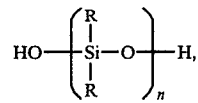

in which R is a hydrogen atom or a monovalent hydrocarbon group and n is a positive integer, end-blocked with hydroxy groups and having a viscosity of at least 100,000 centistokes at 25° C. with from 70 to 30% by weight of an organopolysiloxane composed of the monofunctional siloxane units $R_3^1SiO_{0.5}$, in which $R^1$ is a monovalent hydrocarbon group, and the tetrafunctional siloxane units $SiO_2$, the molar ratio of $R_3^1SiO_{0.5}/SiO_2$ being in the range from 0.4 to 1.15.

3. The adhesive sheet material as claimed in claim 1 wherein the protecting covering sheet made of a hydrophilic material has a sandwich structure composed of two cellophane sheets and a polymer of acrylamide grafted on starch sandwiched between the cellophane sheets.

4. The adhesive sheet material as claimed in claim 1 wherein the protecting covering sheet is a laminated sheet composed of a sheet of a hydrophilic material and a metal foil, said protecting covering sheet being applied and bonded to the sticky layer on the surface of the sheet of the hydrophilic material.

* * * * *